United States Patent [19]

Flytzani-Stephanopoulos

[11] Patent Number: 5,538,703
[45] Date of Patent: Jul. 23, 1996

[54] HOT GAS DESULFURIZATION BY INJECTION OF REGENERABLE SORBENTS IN GASIFIER-EXIT DUCTS

[75] Inventor: Maria Flytzani-Stephanopoulos, Winchester, Mass.

[73] Assignee: Massachusetts Institute of Technology, Cambridge, Mass.

[21] Appl. No.: 506,125

[22] Filed: Jul. 24, 1995

Related U.S. Application Data

[63] Continuation of Ser. No. 145,440, Oct. 29, 1993, abandoned.
[51] Int. Cl.⁶ .......................... B01D 53/52; B01D 53/48
[52] U.S. Cl. .............. 423/230; 423/244.02; 423/244.06
[58] Field of Search .................... 423/230, 220, 423/231, 242.1, 244.06, 244.02

[56] References Cited

U.S. PATENT DOCUMENTS

| | | | |
|---|---|---|---|
| Re. 33,393 | 10/1990 | Kidd | 423/230 |
| 3,441,370 | 4/1969 | Gutmann et al. | 423/230 |
| 4,088,736 | 5/1978 | Courty et al. | 423/230 |
| 4,123,502 | 10/1978 | Holter et al. | 423/230 |
| 4,132,764 | 1/1979 | Cines et al. | 423/418.2 |
| 4,276,271 | 6/1981 | Manning et al. | 423/220 |
| 4,725,415 | 2/1988 | Kidd | 423/230 |
| 4,775,392 | 10/1988 | Cordier et al. | 48/92 |
| 4,783,325 | 11/1988 | Jones | 423/235 |
| 4,830,734 | 5/1989 | Nagji et al. | 208/208 R |
| 4,852,995 | 8/1989 | Cordier et al. | 48/197 R |
| 4,973,459 | 11/1990 | Lippert et al. | 423/244.01 |
| 4,977,123 | 12/1990 | Flytzani-Stephanopoulos | 502/84 |
| 5,102,854 | 4/1992 | Delzer et al. | 502/410 |
| 5,114,581 | 5/1992 | Goldsmith et al. | 210/650 |
| 5,114,690 | 5/1992 | Moore | 423/230 |
| 5,120,508 | 6/1992 | Jones | 422/171 |
| 5,178,843 | 1/1993 | Delzer et al. | 423/220 |
| 5,198,002 | 3/1993 | Mei et al. | 95/275 |

FOREIGN PATENT DOCUMENTS

| | | | |
|---|---|---|---|
| 52-21274 | 2/1977 | Japan | 423/231 |
| 63-89409 | 4/1988 | Japan | 423/231 |
| 63-134028 | 6/1988 | Japan | 423/231 |

OTHER PUBLICATIONS

S. Lew et al., "The Reduction of Zinc Titanate and Zinc Oxide Solids", Chemical Engineering Science, vol. 47, No. 6, 1992, pp. 1421–1431.

S. Lew et al., "Sulfidation of Zinc Titanate and Zinc Oxide Solids", Ind. Eng. Chem. Res., vol. 31, 1992, pp. 1890–1899.

C. Marcilly et al., "Preparation of Highly Dispersed Mixed Oxides and Oxide Solid Solutions by Pyrolysis of Amorphous Organic Precursors", Journal of The American Ceramic Society—Discussions and Notes, vol. 53, No. 1, pp. 56–57. (1970).

Primary Examiner—Wayne Langel
Assistant Examiner—Peter Thomas DiMauro
Attorney, Agent, or Firm—Weingarten, Schurgin, Gagnebin & Hayes

[57] ABSTRACT

A method and system for capturing $H_2S$ from hot gas streams such as from a coal or other fuel gasifier are disclosed. Zinc or zinc oxide precursors in gas, liquid, or fine powder form are injected into the hot duct work of coal gasifier exit after fly ash has been removed to react with $H_2S$ gas. In addition to ZnO sulfidation, a portion of the Zn-based reagents converted to the vapor state in the reducing fuel gas environment, reacts with $H_2S$ and forms fine ZnS particles that are then collected on a high efficiency, high temperature filter. Periodically, the filter is backflushed, and spent sorbent is collected in a hopper, removed for regeneration, and returned to the injection system.

31 Claims, 2 Drawing Sheets

HOT GAS DESULFURIZATION BY INJECTION OF REGENERABLE SORBENTS IN GASIFIER-EXIT DUCTS

This application is a continuation of application Ser. No. 08/145,440, filed Oct. 29, 1993, abandoned.

FIELD OF THE INVENTION

This invention relates to hot gas cleanup control, and more particularly to methods of removal of hydrogen sulfide, carbonyl sulfide, elemental sulfur, other reduced sulfur compounds, or organosulfur compounds from gasifier-product gas streams using zinc-based sorbents.

BACKGROUND OF THE INVENTION

Advanced coal utilization and conversion processes for power generation, such as the integrated gasification combined cycle (IGCC) employing gas turbines or the gasification-molten carbonate fuel cell (MCFC) power plants, offer higher cycle efficiency, lower $CO_2$ emissions per kilowatt-hour generated, and the ability to attain more stringent environmental standards for $SO_2$, $NO_x$, and particulates than direct coal-fired atmosphere boilers. However, the coal gasifier product gas typically contains several thousand ppm $H_2S$. For these advanced coal conversion processes to become commercially feasible, the H2S emission level must be reduced to meet environmental standards, improve process efficiency to competitive levels, and reduce corrosion of the downstream process equipment. Turbines, for example require a level of $H_2S$ in the fuel gas stream of approximately 10 ppm and fuel cells a level of approximately 1 ppm for proper operation.

Current commercial liquid scrubbing $H_2S$ removal processes occur at or below ambient temperatures, leading to thermal efficiency losses, and require further treatment of the waste water. Thus, a high temperature gas desulfurization process is needed.

Each of the three types of currently commercially feasible gasifiers, fixed bed, fluidized bed, and entrained bed, operates under different conditions and generates a fuel gas with distinct temperatures, pressures, and gas compositions. Fixed bed gasifiers have outlet temperatures below 650° C., fluidized bed gasifiers as high as 1050° C., while in entrained bed gasifiers, the exit temperature can exceed 1250° C. Water vapor is present in the gas, in amounts depending on gasifier type and the extent of quenching. A representative air-blown fluidized bed-gasifier product gas composition is 54% $N_2$, 7.5% $CO_2$, 16% CO, 11% $H_2$, 0.42% $H_2S$, 11% $H_2O$, with traces of COS, $O_2$, and argon. In addition, the mass concentration of ash in this stream is typically 1000 to 5000 ppmw. The presence of ash, hydrogen sulfide, and high concentration of water vapor makes the downstream hot gas clean-up processing particularly challenging.

Throwaway sorbents, such as calcium-based limestone and dolomite have been considered for in-bed (within the gasifier vessel) desulfurization. This is effective in fluidized-bed gasifiers, achieving greater than 90% sulfur removal, and less effective in fixed bed and entrained bed gasifiers, where only 25–60% sulfur removal can occur by CaO-sorbents. Additional problems of fly ash-CaO interaction have been reported, limiting the utility of these throwaway materials. Solid waste disposal and landfill cost increases likely in the near future make these "cheap" sorbents even less attractive.

External desulfurization processes with regenerable, mixed-metal oxide sorbents are presently under development to meet the stringent hot gas cleanup requirements. The attractiveness of these materials arises from their high sulfur removal efficiency, which can exceed 99% for each type of gasifier after adjusting the exit gas temperature to the range appropriate for the chosen sorbent.

Current hot gas desulfurization process options using regenerable sorbents employ fixed bed, fluidized bed, and moving bed systems. However, these systems are subject to a number of problems, which limit their commercial viability, including degradation, e.g., via mechanical attrition, spalling, or decrepitation of both conventional and advanced sorbents, and the resulting problems of downstream process contamination, release of toxic metals to the environment and loss of performance.

For example, fixed bed systems involve changes in operating characteristics during bed switching and variability of flow through the bed. Moving bed systems involve complex solids handling problems, including sealing an oxidizing environment from a reducing environment in the presence of high solids loadings. Fluidized bed systems must operate within a narrow size distribution of sorbent particles to maintain fluidization without loss of sorbent. Also, the particles are subject to severe impaction within the bed, limiting their ability to withstand the many cycles necessary for a commercial process. Sorbent degradation in fixed beds occurs at a lesser rate than in fluidized or moving beds. However, spalling of the sorbent during operation can plug the bed and cause a large pressure drop. Sorbent particle attrition in fluidized and moving beds decreases performance as sorbent fines escape downstream.

Each process also put constraints on the sorbent properties. A trade-off exists between the overall reaction rate and the structural strength of the sorbent particles. This trade-off occurs because the overall reaction is limited both by gas and solid diffusion. For example, in a fixed bed employing pellets, a product layer film forms on the outer surface of the pellet, hindering diffusion of the gas to the unreacted interior. Typically, the metal sulfide product has larger molecular volume than the starting oxide, thereby causing closure of the pores. Low porosity, durable sorbents can be used only at reduced space velocities, requiring larger reactor beds. Making the initial pellet with high porosity would achieve more complete reaction, albeit at the expense of mechanical strength. Production of bulk sorbents with both high macroporosity and good mechanical strength still eludes the art. U.S. Pat. No. 4,977,123 teaches a method for such solids production under specific heat treatment conditions.

Because of the range of gasifier outlet conditions, particularly temperature, many sorbents have been studied for hot gas desulfurization. Early work focused on zinc or iron oxides or combinations of reactants/stabilizers on high surface area substrates. These sorbents react with hydrogen sulfide to form zinc and iron sulfides.

Zinc oxide can achieve a higher degree of gas desulfurization than iron oxide, which, however, is easier to regenerate. The sulfidation reaction of zinc oxide is:

$$ZnO(s)+H_2S(g) \rightarrow ZnS(s)+H_2O(g) \qquad (1)$$

Removal to below 15 ppm $H_2S$ is possible with zinc oxide at temperatures up to 1000° K. for fuel gases containing up to 10% $H_2O$ vapor. Typically, however, zinc oxide sorbents show low utilization, less than 20% of the theoretical. This is due to formation of a product layer of ZnS around the unreacted oxide core, thus slowing the reaction rate. Particles of high porosity help to alleviate this problem.

A drawback to ZnO has been that, in highly reducing atmospheres, such as in gasifier exit gases with high $H_2$ and CO contents, zinc oxide is partially reduced to elemental zinc, a liquid above 419° C. which has considerable vapor pressure at the hot gas cleanup temperatures (>550° C.). Thus, zinc can be lost to the system, or condense as a ZnS layer on the outside of the reacting particles. See Lew et al., "Sulfidation of Zinc Titanate and Zinc Oxide Solids," Industrial and Engineering Chemistry Research, Vol. 31, No. 8, p. 1890–1899 (1992).

Zinc vapor and zinc oxides have been disclosed for use at low temperatures (below 600° C.) in conjunction with manganese and its oxides used at high temperatures for desulfurization of a byproduct from injection of coal in a molten iron bath, a process used in steel making. See U.S. Pat. No. 4,852,995. However, such processes do not operate under the same conditions or produce the same gas compositions as with coal gasifiers in the present invention.

Testing of mixed oxide sorbents has also been undertaken, since these sorbents generally offer physical advantages, such as better dispersion and a lower propensity to sintering, and chemical advantages such as activity and regenerability, compared to uncombined active oxides. For instance, zinc ferrite ($ZnFe_2O_4$) is a better overall sorbent than either of its constituent oxides and has been extensively studied for hot gas cleanup applications. However, zinc ferrite decomposes into ZnO and $Fe_3O_4$ in the reducing conditions of the gasifier outlet. Thus, as with zinc oxide, formation of zinc vapor limits the use of zinc ferrite to a temperature up to 550° C. and to mildly reducing environments.

Zinc titanates have also been studied, since they exhibit slower reduction to volatile zinc than zinc oxide. The sulfidation reaction is:

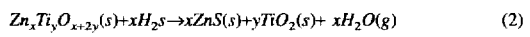
$$Zn_xTi_yO_{x+2y}(s)+xH_2S \rightarrow xZnS(s)+yTiO_2(s)+ xH_2O(g) \qquad (2)$$

However, some reduction of the zinc titanates to Zn vapor also occurs, more so from ZnO-rich compositions. In these zinc titanates, zinc vaporization will gradually enrich the particle surface with a dense zinc sulfide layer from reaction with the zinc vapor and $H_2S$, slowing the reaction rate and enhancing undesirable sintering.

Efforts at making sorbents more attrition resistant have also been undertaken. Variations to the several sorbent manufacturing techniques, such as spray drying, impregnation, crushing and screening and granulation, and different binders and chemical additives, such as bentonite and molybdenum, have been studied. Supported sorbents, involving metal oxides and mixed-metal oxides on alumina particles or zeolites, are also under investigation. However, achieving a balance between pore diffusion rate limitations and solid phase reaction rates is currently beyond the state of the art. Therefore, the development of suitable sorbents is presently limiting the commercial development of hot gas desulfurization technology.

Sorbent regeneration also presents difficulties. Regeneration processes may be performed in place with fixed beds. However, sorbent regeneration is an exothermic reaction subject to high bed temperature excursions which can sinter and reduce the effectiveness of the sorbent. Regeneration with fluidized or moving bed systems can be accomplished in separate vessels, allowing for better temperature control, but requires more complex hardware. Also, reducing the temperature below a certain value can lead to the undesirable formation of sulfate species. Additionally, the gas phase concentrations of $SO_2$ and $O_2$ at a fixed temperature determine whether sulfates are thermodynamically favored. Sulfate formation is detrimental, as it usually causes severe swelling of the solid, the sulfate having much larger volume than the oxide. This effect will cause spalling or decrepitation of the particle during the next reductive sulfidation cycle. Controlling all three of these variables, temperature, $SO_2$ and $O_2$ concentrations, in the fixed bed, fluidized bed, and moving bed processes to avoid both sintering and sulfate formation is difficult. Also, no sorbent has shown regenerability over a commercially useful lifetime.

At the present time, all three types of hot gas desulfurization processes are limited by inadequate sulfur loading on the sorbent and/or poor sorbent stability and regenerability. Further efforts to improve the sorbent performance by chemical modifications and structural strengthening are underway. These are expected to be of marginal impact. Accordingly, a different process design, much less sensitive to the physical properties and/or changes of the selected sorbent, is needed.

SUMMARY OF THE INVENTION

The invention is an attrition-tolerant process for removing hydrogen sulfide ($H_2S$) from hot gas streams bearing $H_2S$, such as from a coal gasifier product gas. The invention involves injection of a zinc- or zinc oxide-based sorbent into a hot gas downstream of a hot gas particulate removal device, followed by collection of the reacted sorbent in a high efficiency filter or other particulate removal device. Upstream, separate removal of fly ash particles allows the handling of spent sorbent particles in a separate stream, i.e., it allows for sorbent regeneration. The choice of sorbent is more flexible in this process, as finely divided solid particles (of approximately 50 μm diameter or less) can be used. These have higher overall reactivity compared to pellets (mm sized) or fluid bed-sized solids (a few hundred μm size). Moreover, the use of vaporizable sorbents, such as zinc, detrimental in other hot gas cleanup processes, is advantageous here. This is because the vapor phase sulfidation of zinc is much faster than the solid-gas reaction of ZnO and $H_2S$ such that higher sorbent utilization occurs under conditions favoring zinc vapor formation. The resulting ZnS aerosols grow to fine particles in the hot duct and are collected in a highly efficient particle removal device, such as a ceramic filter, which can capture even sub-micron size particles. The high efficiency filter is periodically back-pulsed to clean the filter. The dislodged particles are removed to a separate system for sorbent regeneration to be recycled back into the desulfurization process.

Because of the use of a high-efficiency filter to capture even sub-micron particles and to be regenerated by back-pulsing at temperatures up to 1000+° C., small particles resulting from attrition of the sorbent or vapor phase sulfidation reactions can be readily handled. Consequently, the process does not demand the extreme attrition resistance required in other processing schemes, nor is the process adversely affected by the vaporization of metals. The ex-situ sorbent regeneration process can be more closely controlled than in prior regeneration systems associated with fixed, fluidized, or moving beds. The disclosed process is more compact, requires less hardware, and is more flexible in regards to the state, size, and physical properties of the sorbent.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
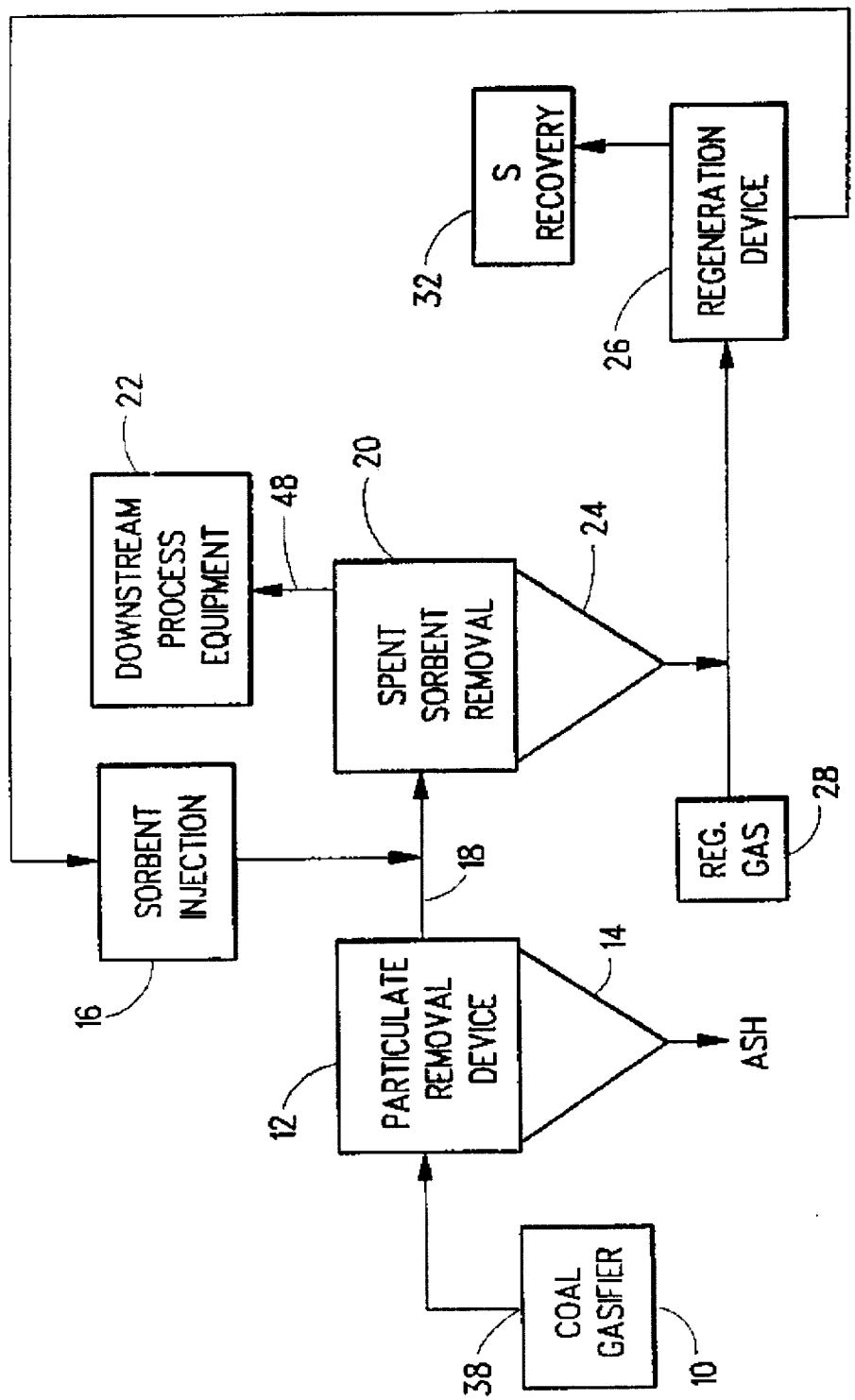
FIG. 1 is a schematic diagram of the sorbent injection process of the invention.

The present invention is illustrated schematically in FIG. 1 in conjunction with a gasifier system. Coal is gasified in a coal gasifier 10. Any desired gasifier process, such as a fixed bed, fluidized bed, or entrained gasifier system, may be used. The resulting combustible gas is typically at a temperature in the range of 600° to 1000° C. and a pressure in the range of 10 to 20 atm at the gasifier exit 38, although the exact temperatures and pressures will vary depending on the type of gasifier, extent of quenching with water, and type of coal used. A lower pressure of 1 atmosphere and a temperature as low as 350° C. may be employed. Similarly, the composition of the resultant gas will vary depending on the type of gasifier, extent of quenching, type of coal used, and whether or not in-bed desulfurization is used in the gasifier. However, the gas will typically contain between 1000 and 5000 ppmw of particulates, primarily ash, at least 0.03% (or 300 ppmv) hydrogen sulfide ($H_2S$), at least 10% $H_2$ and CO, at least 5% $CO_2$, and a variable concentration of water vapor, typically no less than 10%.

To prevent damage to the downstream process equipment, the gas is transferred to a particulate removal device 12 to remove any ash from the gas. The particulate removal device 12 may comprise a high efficiency ceramic filter, an electrostatic precipitator, or any other suitable device capable of operating at high temperatures. The particulate removal device 12 contains a hopper 14 to facilitate removal of the collected ash.

Downstream from the particulate removal device 12, a sorbent injection device 16 injects finely divided zinc- or zinc oxide-based sorbent through, for example, one or more injection nozzles or other suitable devices into the hot gas ducting 18. The sorbent is injected as a slurry with liquid such as water, provided as a liquid solution such as an aqueous solution, or can be entrained in a gas stream. The zinc oxide-based sorbent may comprise zinc oxide, zinc titanates, zinc ferrite, or other ZnO-based sorbents, such as manganese zinc ferrites, zinc aluminates, zinc silicates, copper zinc oxide or the like. The sorbent, in fine powder form, has a particle size of 50 μm or less and preferably a particle size in the range of 5 μm to 20 μm. Alternatively, the sorbent may be supported on a high-surface area ceramic support, such as zeolites, alumina, silica, titania, chromia, ceria, magnesia, or the like, suitably chosen for this application. The particle size of the support can be 100 μm or less. The sorbent may be entrained in a gas, such as clean fuel gas for injection if desired, or it may be injected as a slurry with water.

Alternatively, zinc and its compounds in solid, liquid, or vapor form can be employed for injection. For example, zinc hydroxide, zinc carbonate, zinc acetate, zinc formate, dimethyl zinc, or diethyl zinc, could be directly injected in the hot duct 18 to provide zinc vapor or zinc vapor and zinc oxide aerosols to capture the hydrogen sulfide of the fuel gas. When selecting such a compound of zinc, the resulting non-zinc compound should preferably be a fuel itself, such as methane, ethane, or carbon monoxide. It could also be $H_2O$ and/or $CO_2$ that already exist in the fuel gas. Inorganic compounds of zinc, such as chloride, bromide, sulfate, or nitrate, should be avoided, so as not to introduce new contaminants in the fuel gas. While any state of zinc or zinc oxide is effective in the present invention, a decision based on the overall economics of the process, including the regeneration step, will dictate the most suitable choice.

The $H_2S$ in the now ash-free gas stream reacts with the injected sorbent. For example, with zinc oxide, the reaction proceeds according to the previously mentioned reaction (1):

$$ZnO(s)+H_2S(g) \rightarrow ZnS(s)+H_2O(g) \tag{1}$$

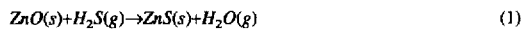

Additionally, at the high temperatures and under the reducing conditions present in the duct 18, a portion of the zinc oxide reacts with hydrogen, $H_2$, present in the gas stream to produce zinc vapor and water:

$$ZnO(s)+H_2(g) \rightarrow Zn(g)+H_2O(g) \tag{3}$$

Alternatively, ZnO can be reduced by the carbon monoxide present in the gas to produce Zn vapor and $CO_2$:

$$ZnO(g)+CO(g) \rightarrow Zn(g)+CO_2(g) \tag{3}$$

When the injected sorbent is in the form of zinc or zinc compounds, zinc vapor is produced directly by vaporization or thermal decomposition upon injection in the hot duct 18. As set forth above, vaporization of metal species has long been a drawback to the use of metal-oxide-based solid sorbents in prior desulfurization processes. However, in the present invention, the zinc vapor subsequently reacts with $H_2S$ in the gas stream to form ZnS aerosols:

$$Zn(g)+H_2S(g) \rightarrow ZnS(s)+H_2(g) \tag{4}$$

Similarly, Zn vapor can react with COS in the gas stream to form ZnS aerosols. ZnS forms almost instantaneously in the gas phase and then rapidly condenses on the remaining core particle (e.g., the $TiO_2$ portion of a zinc titanate sorbent, if such sorbent is used) or nucleates to an ultrafine ZnS "smoke." At high temperatures, aerosol particles will grow by coalescence to submicron or larger size particles.

A particulate removal device 20 having a high removal or capture efficiency is provided downstream from the injection site. In an illustrative embodiment, a high efficiency filter is used. The filter is mounted within a refractory-lined pressure vessel or pressurizable casing. A ceramic filter such as that developed by CeraMem Corporation, described in U.S. Pat. No. 5,114,581, is suitable. This filter is a compact, monolith-based ceramic filter performing surface filtration on thin membrane walls. However, any filter, such as a ceramic candle, or any other suitable particulate removal device, having a removal efficiency of greater than 99% for particles of 1 μm or less and capable of operating at temperatures as great as 1000° C. may be used. Particles with ZnS "condensate," any ultrafine nucleated ZnS particles, unreacted support particles, and any smaller particles resulting from attrition of the sorbent particles are all captured on the filter because of its high retention efficiency.

Clean fuel gas passing through the device 20 is then passed through ducting 48 to the downstream process equipment 22, such as gas turbines or fuel cells. Therefore, the overall process is highly efficient for $H_2S$ capture even in the presence of some or extensive zinc vaporization, a barrier to the commercialization of prior art zinc-based sorbent chemistries.

The length of the duct 18 is chosen to provide a sufficient residence time to complete the sorbent/$H_2S$ reaction. A sufficient residence time is generally less than 3 seconds, although it may be as low as approximately one second or less. Such small residence times minimize the length of duct work needed to allow the reactions to proceed to completion. Further, due to the low residence times and effectiveness of the reactions, the entrance angle of the injection nozzle and size of the ducting are generally not critical.

The feed rate of the zinc-based sorbent from the sorbent injection device 16 is determined by the amount and feed rate of $H_2S$ in the gas stream. Desirably, all the $H_2S$ reacts. It is well known, that solid sorbent utilization is limited by gas phase transfer and particle-processes, such as pore diffusion or diffusion through solid product layers. While these processes are enhanced for small-size particles, one may have to use essentially micrometer-size particles to overcome diffusion limitations. Such is the case, for example, with calcium oxide particles used in $SO_2$ removal from coal-combustion gases, where the ratio of $Ca/SO_2$ needed is typically at least twice as high as the stoichiometric (based on the amount of $SO_2$ present in the gas). With vaporizable sorbents, however, where the gas-phase capture of the contaminant is fast, the need to exceed the reaction stoichiometry is obviated. Thus, because of reaction (3), a zinc-to-sulfur ratio as low as 1:1, equal to stoichiometric (see reactions (1) or (4)), may be used. The zinc-to-sulfur ratio may be greater than 1:1, depending on the conditions, to ensure that substantially all the sulfur is captured. Excess zinc is to be avoided under highly reducing conditions to prevent escaping of zinc vapor, since zinc is corrosive to the turbine blades. Thus, a sufficient length of ducting 18 is used to fully react the zinc and prevent zinc vapor from passing downstream to the turbines.

As stated above in gasifier-exit ducts, the combination of high temperature and pressure creates a mass transfer limitation in the bulk gas phase surrounding the injected particles. The diffusion rate of hydrogen to the particle will be much higher than that of $H_2S$, due to both the higher diffusion coefficient and the much higher partial pressure of hydrogen. This will be more pronounced when in-bed desulfurization is employed in the gasifier resulting in a product gas with a very high $PH_{H_2}/P_{H_2}^S$ ratio. This highly reducing gas prohibits use of zinc-rich sorbents in conventional desulfurization reactor designs, i.e., fluid, packed- or moving-bed. On the contrary, in the present invention, use of zinc-based sorbents is advantageous, as the production of vapor phase zinc enhances the total reactivity of the sorbent with $H_2S$ and improves the $H_2S$ removal efficiency. It is noteworthy that the equilibrium constant of reaction (4) is several orders of magnitude higher than that of reaction (1). Thus, zinc vapor is a more effective desulfurization agent than ZnO.

Figure 2:
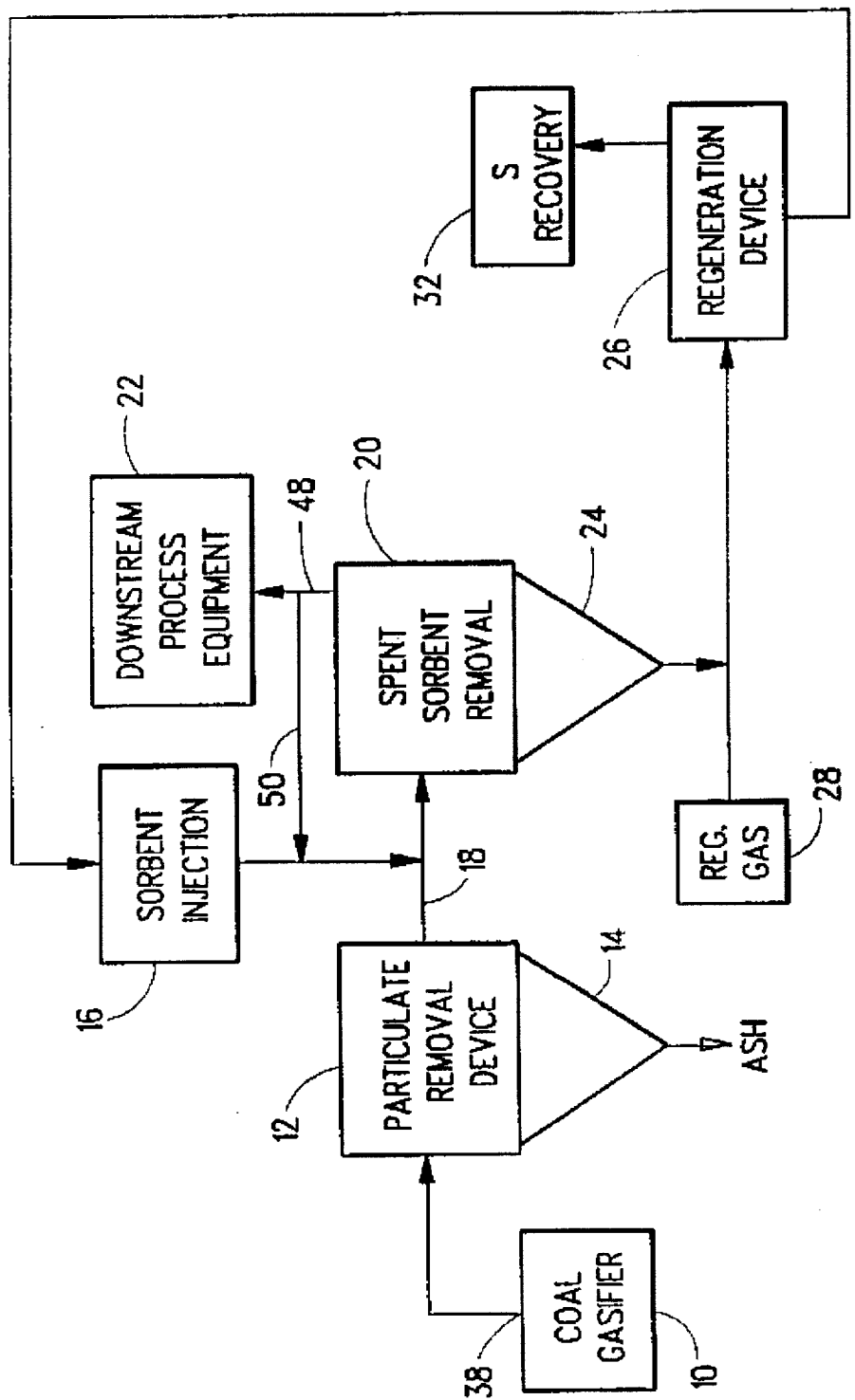
FIG. 2 is a schematic diagram of a further embodiment of the sorbent injection process of the invention.

The use of vaporizable sorbents also relaxes the requirement of good mixing of injected particles within the duct 18. Thus, if zinc vapor is produced, mixing of the resulting gas streams is a much simpler problem to solve. This would effectively eliminate the need for very long ducts and/or high solids/$H_2S$ feed ratios, exceeding the stoichiometry of sulfidation reactions. To improve the production of zinc vapor, the sorbent may be injected into a portion 50 of clean fuel gas diverted from the stream 48 from the device 20 to begin or complete the reduction reaction prior to introducing the sorbent into the exhaust stream from the gasifier exit, as shown schematically in FIG. 2.

The present invention provides the highest flexibility in temperature application of Zn- or ZnO-based sorbents. Thus, a wide temperature range of 350°–1000° C. is suitable for injection. More preferably, the high temperature end, 650°–1000° C., should be used to take advantage of the zinc vapor reaction with $H_2S$. The higher the temperature, the higher the reduction rate of ZnO, reaction (3), and the higher the reactivity of both the zinc vapor and any remaining ZnO particles with $H_2S$. Also, when zinc vaporizes from the particle, this effectively reduces the remaining particle size and increases the reacting surface area, thus increasing the particle reactivity. Finally, at high temperatures, the growth of ZnS smoke to larger aerosol particles and their sintering rate will be enhanced so that they can be more readily and effectively removed from the cleaned fuel gas. Again, the present process can benefit from a higher operating temperature whereas, in conventional desulfurization designs, zinc oxide-based sorbents are limited to low temperature use.

Other advantages of the present invention include use of more compact, less complex, potentially lower cost equipment, and external regeneration of the spent sorbent which enables better control of the process and operational flexibility. A highly efficient filter or other particulate removal device capable of operation at high temperatures and with the ability to remove substantially all sorbent particles, regardless of size obviates the problems associated with attrition of the sorbent in prior art processes.

In the illustrative embodiment, spent sorbent is dislodged periodically from the filter by backpulsing the filter with a pulse of compressed air. The dislodged spent sorbent is either collected in a hopper 24, from which it is periodically removed or continuously carried away into a regeneration device 26. In the regeneration device 26, regeneration of the sorbent takes place by oxidation. Regeneration gas 28 is input upstream of the regeneration device 26, and is carried to the regeneration device 26. The regeneration gas 28 is air or air diluted with nitrogen or steam, as in conventional sulfided sorbent regeneration processes. Regeneration preferably is performed in a temperature range between 650° C., to prevent formation of stable sulfates, and 850° C. to prevent sorbent sintering. Regeneration of the highly sulfided sorbent also produces a concentrated $SO_2$ stream, which can be converted over a catalyst to a useful byproduct such as oleum, sulfuric acid or elemental sulfur in a sulfur recovery process 32. The regenerated sorbent provided by the regeneration device 26 is transferred back to the sorbent injection device 16.

The process of the present invention was tested, as shown in the following examples:

EXAMPLE 1

Zinc oxide powder (Johnson Matthey Co.) with a surface area of 2.9 $m^2/g$ was sieved to three particle sizes, 44–53µm, <44µm, and <10 µm and dried at 110° C. prior to use. A synthetic gas mixture simulating a coal gasifier exit gas with nitrogen substituting for water vapor was fed through a quartz tube section heated to a desired temperature. The molar composition of the gas mixture used was 31.3% $H_2$, 46.5% CO, 14.1% $CO_2$, 7.7% $N_2$, and 0.4% $H_2S$. A constant flow rate of the gas stream was used at a pressure of 1 atm. A steady feed rate of zinc oxide particles entrained in $CO_2$ gas was used in amounts corresponding to a molar ratio of Zn:$H_2S$=1.0 or 1.15. The residence time based on the bulk gas flow rate and temperature was 1 sec. A ceramic filter installed in the hot reactor zone was used to collect the solids. The gas exiting the filter was analyzed for $H_2S$ by gas chromatography. No particles escaped the filter. At 750° C., all three particle sizes were equally effective for complete (>99.9%) removal of $H_2S$ when the ratio of Zn:$H_2S$ was equal to 1.15. At the stoichiometric ratio of 1:1, the particles of size <44µm showed better than 98% $H_2S$ removal.

EXAMPLE 2

Zinc orthotitanate, $Zn_2TiO_4$, was prepared according to the amorphous citrate technique (Marcilly et al., J. Am. Ceram. Soc. 53(1):56–57 (1970)) from zinc acetate, titanium (IV) isopropoxide, and citric acid precursors, after drying and calcining in air at 720° C. for 12 hr, then at 850° C. for 1.3 hr. The resulting surface area of the titanate was 2.5 $m^2/g$. Two particle sizes, 44–88 μm and <44 μm, were sieved and kept in a dessicator. The reactor system, gas flow rate and composition, temperature, pressure, residence time, particle collection system, and gas analysis technique were the same as in Example 1. The zinc titanate particles, entrained in $CO_2$, were injected into the hot (750° C.) section of the reactor at steady feed rates corresponding to two molar ratios of $Zn:H_2S=1.0$ or 1.5. At a molar ratio of $Zn:H_2S=1.5:1$, both particle sizes were effective at substantially completely (99.9%) removing the $H_2S$ from the gas at 750° C. At the stoichiometric ratio, the particles with size <44 μm were capable of removing 86% of the $H_2S$ in the gas.

Although the system and process of the present invention have been described with respect to an integrated gasification combined cycle, the invention is operable with any similar process which generates a hot gas stream bearing $H_2S$ or other organic sulfur-bearing compounds, such as COS, $CS_2$, methyl mercaptans, or the like. For example, the invention is also applicable to gasifier/molten carbonate fuel cell power plants.

Also, the invention has been described for zinc compounds that can produce elemental zinc vapor which can remove $H_2S$ effectively from the gas phase forming zinc sulfide particles. Similarly, other non-zinc containing sorbents can be used, under the same principles of operation; namely, if they can exist in part as vapors under reaction conditions, forming aerosols of the product sulfides, thus aiding the overall reactivity of the sorbent.

Similarly, a single filter to collect spent sorbent particles has been described. However, if desired, a plurality of filters arranged in parallel flow paths could be provided. The number of filters would be determined by the volumetric flow through the system. The filters could be mounted in a single high-pressure, high-temperature, refractory lined vessel or housing. Regeneration of the filters could be achieved by backpulsing each filter in sequence, the particles being collected in a hopper in the bottom of the vessel. Alternatively, any other particle removal device such as a highly efficient electrostatic precipitator, or the like could be used. Similarly, the invention has been described as utilizing backpulsing with a compressed gas to regenerate the filter and collect the sulfided sorbent for regeneration. However, if desired, the filter could be regenerated in any other manner, such as by in-situ regeneration with diluted air, which would simultaneously regenerate the sorbent particles and dislodge them for recirculation to the duct.

These and other variations in the sorbent system, particle collection, regeneration and recycling parts of the process are allowed within this invention. Similarly, various approaches to sulfur recovery within or external to the regenerator vessel can be used. It should be appreciated that the foregoing and other changes, omissions and additions in the form and detail thereof may be made without departing from the spirit and scope of the invention as delineated in the claims.

What is claimed is:

1. An attrition-tolerant process to remove sulfur compounds from a hot gas stream containing sulfur compounds including $H_2S$ and/or organic sulfur compounds, comprising the steps of:

providing at a first location in a duct a hot gas stream containing $H_2S$ and/or organic sulfur compounds, said gas stream providing a reducing environment, the gas stream containing ash and $H_2S$ and/or organic sulfur compounds;

removing, downstream from said first location, said ash from the gas stream at an ash removal location in said duct;

introducing into said gas stream in said duct at a second location, downstream from said first location and downstream from said ash removal location, a regenerable sorbent comprising an elemental Zn vapor precursor, said elemental Zn vapor precursor capable of yielding elemental Zn vapor in said gas stream;

causing a portion of said elemental Zn vapor precursor to vaporize to Zn vapor in said reducing environment and to react in the vapor state with a portion of said sulfur compounds;

causing unvaporized elemental Zn vapor precursor to react with a further portion of said sulfur compounds;

directing said gas stream to a particle removal device capable of removing particles, whereby a cleaned gas stream discharges from said particle removal device;

collecting reacted sorbent particles from said particle removal device for regeneration and reuse in said gas stream in the duct; and regenerating the collected reacted sorbent particles.

2. The process of claim 1, wherein said sulfur compounds include $H_2S$, COS, $CS_2$, methyl mercaptans, or mixtures thereof.

3. The process of claim 1, wherein said Zn vapor precursor comprises a zinc oxide-containing sorbent.

4. The process of claim 3, wherein said zinc oxide-containing sorbent comprises zinc oxide, zinc titanate, zinc ferrite, manganese zinc ferrite, zinc aluminate, zinc silicate, copper zinc oxide, or mixtures thereof.

5. The process of claim 1, wherein said Zn vapor precursor is in powder form.

6. The process of claim 5, wherein said Zn vapor precursor has a mean particle size of less than 50 μm.

7. The process of claim 5, wherein said Zn vapor precursor has a mean particle size in the range of 5 μm to 20 μm.

8. The process of claim 5, wherein said Zn vapor precursor is supported on a ceramic support.

9. The process of claim 8, wherein said ceramic support comprises zeolites, alumina, silica, titania, chromia, ceria, magnesia, or mixtures thereof.

10. The process of claim 1, wherein said Zn vapor precursor is in solid, liquid, or vapor form.

11. The process of claim 10, wherein said Zn vapor precursor comprises zinc hydroxide, zinc carbonate, zinc acetate, zinc formate, dimethyl zinc, or diethyl zinc.

12. The process of claim 1, wherein said particle removal device has a particle removal efficiency of at least 99% of particles of less than 5 μm.

13. The process of claim 1, wherein said particle removal device has a particle removal efficiency of at least 99% of particles of less than 1 μm.

14. The process of claim 1, wherein said reducing environment includes CO.

15. The process of claim 1, wherein said reducing environment includes $H_2$.

16. The process of claim 1, wherein said reacted sorbent particle collecting step comprises backflushing said particle removal device.

17. The process of claim 1, further comprising the step of collecting said reacted sorbent particles dislodged from said particle removal device in said backflushing step.

18. The process of claim 17, further comprising the step of regenerating said Zn vapor precursor from said collected reacted sorbent particles dislodged from said particle removal device.

19. The process of claim 1, wherein said Zn vapor precursor is introduced into the gas stream at a stoichiometric ratio if Zn to S of approximately 1 to 1.

20. The process of claim 1, further comprising the step of providing a residence time of less than three seconds for said reactions of said Zn vapor and said Zn vapor precursor.

21. The process of claim 1, wherein said gas stream has a pressure of at least 1 atm.

22. The process of claim 1, wherein said gas stream comprises at least 300 ppmv $H_2S$.

23. The process of claim 1, further comprising the step of introducing said zinc vapor precursor as a slurry in a liquid.

24. The process of claim 1, further comprising the step of introducing said zinc vapor precursor dissolved in a liquid.

25. The process of claim 1, further comprising the step of introducing said zinc vapor precursor entrained in a gas stream.

26. The process of claim 1, further comprising the step of reintroducing regenerated Zn vapor precursor into the gas stream in the duct.

27. The process of claim 1, further comprising the step of entraining said zinc vapor precursor in a portion of said cleaned gas stream and introducing said portion of said cleaned gas stream back to said gas stream in the duct.

28. The process of claim 26, further comprising the step of entraining said regenerated Zn vapor precursor in a portion of said cleaned gas stream and reintroducing said portion of said cleaned gas stream back to said gas stream in the duct.

29. The process of claim 1, wherein said gas stream at said second location has a temperature of at least 350° C.

30. The process of claim 1, wherein said gas stream at said second location has a temperature of at least 650° C.

31. The process of claim 1, wherein said gas stream is provided from a coal gasifier.

* * * * *